United States Patent
Banthia

(10) Patent No.: US 11,634,361 B2
(45) Date of Patent: *Apr. 25, 2023

(54) POLYMER FIBERS FOR REINFORCEMENT OF CEMENT-BASED COMPOSITES

(71) Applicant: NeoCrest LLC, Concord, MA (US)

(72) Inventor: Nemkumar Banthia, Vancouver (CA)

(73) Assignee: NeoCrest LLC, Concord, MA (US)

( * ) Notice: Subject to any disclaimer, the term of this patent is extended or adjusted under 35 U.S.C. 154(b) by 31 days.

This patent is subject to a terminal disclaimer.

(21) Appl. No.: 17/166,436

(22) Filed: Feb. 3, 2021

(65) Prior Publication Data

US 2021/0155541 A1    May 27, 2021

Related U.S. Application Data

(63) Continuation of application No. 16/069,879, filed as application No. PCT/CA2017/050630 on May 24, 2017, now Pat. No. 10,947,156.

(60) Provisional application No. 62/340,671, filed on May 24, 2016.

(51) Int. Cl.
| | |
|---|---|
| *C04B 16/06* | (2006.01) |
| *C04B 18/14* | (2006.01) |
| *C04B 24/26* | (2006.01) |
| *C04B 20/00* | (2006.01) |
| *C04B 28/02* | (2006.01) |
| *E04C 5/07* | (2006.01) |
| *D01F 1/10* | (2006.01) |
| *D01F 6/04* | (2006.01) |
| *D01F 6/46* | (2006.01) |
| *D01F 6/06* | (2006.01) |
| *D06M 15/333* | (2006.01) |
| *D06M 101/20* | (2006.01) |

(52) U.S. Cl.
CPC ...... *C04B 16/0633* (2013.01); *C04B 16/0625* (2013.01); *C04B 18/146* (2013.01); *C04B 20/0068* (2013.01); *C04B 24/2623* (2013.01); *C04B 28/02* (2013.01); *D01F 1/10* (2013.01); *D01F 6/04* (2013.01); *D01F 6/46* (2013.01); *E04C 5/073* (2013.01); *D01F 6/06* (2013.01); *D06M 15/333* (2013.01); *D06M 2101/20* (2013.01)

(58) Field of Classification Search
CPC ............. C04B 16/0633; C04B 18/146; C04B 24/2623; C04B 28/02; C04B 20/0068; D06M 15/333; E04C 5/073; D01F 1/10; D01F 6/04; D01F 6/46; D01F 6/06
See application file for complete search history.

(56) References Cited

U.S. PATENT DOCUMENTS

| | | |
|---|---|---|
| 3,925,336 A | 12/1975 | Sawada |
| 4,261,754 A | 4/1981 | Krenchel et al. |
| 4,339,273 A | 7/1982 | Meier et al. |
| 4,363,666 A | 12/1982 | Johnson et al. |
| 4,414,030 A | 11/1983 | Restrepo |
| 4,428,775 A | 1/1984 | Johnson et al. |
| 4,477,522 A | 10/1984 | Sheehan |
| 4,710,540 A | 12/1987 | McAlpin et al. |
| 4,801,630 A | 1/1989 | Chow et al. |
| 4,822,547 A | 4/1989 | Derrick |
| 4,952,631 A | 8/1990 | McAlpin et al. |
| 5,154,955 A | 10/1992 | Delvaux et al. |
| 5,443,918 A | 8/1995 | Banthia et al. |
| 5,965,277 A | 10/1999 | Banthia et al. |
| 5,981,630 A | 11/1999 | Banthia et al. |
| 6,008,281 A | 12/1999 | Yang et al. |
| 6,174,601 B1 | 1/2001 | Stanitis et al. |
| 7,247,372 B2 | 7/2007 | Sakamoto et al. |
| 10,947,156 B2 | 3/2021 | Banthia |
| 2005/0118418 A1 | 6/2005 | Sakamoto et al. |
| 2006/0078729 A1 | 4/2006 | Yabuki et al. |
| 2010/0168281 A1 | 7/2010 | Lee et al. |

FOREIGN PATENT DOCUMENTS

| | | | |
|---|---|---|---|
| BE | 899810 A | | 10/1984 |
| CN | 101 323 507 A | * | 12/2008 |
| CN | 101323507 A | | 12/2008 |
| DE | 3210693 A1 | | 10/1983 |
| DE | 3341462 A1 | | 5/1985 |
| EP | 026581 A1 | | 4/1981 |
| EP | 0051256 A2 | | 5/1982 |
| GB | 1478198 A | | 6/1977 |
| GB | 2021552 A | | 12/1979 |
| GB | 2030891 A | | 4/1980 |

(Continued)

OTHER PUBLICATIONS

Ahmed et al., Flexural responses of hybrid steel-polyethylene fiber reinforced cement composites containing high volume fly ash, Construction and Building Materials 21 (2007) pp. 1088-1097.*
Marcincin et al., "Fiber-Forming Blend Polypropylene-Polyvinyl Alcohol Polymers For Advanced Technologies,"Wily & Sons, vol. 12, No. 8, Aug. 1, 2001, pp. 461-465.*
Ahmed, S.F.U. et al. Flexural responses of hybrid steel-polyethylene fiber reinforced cement composites containing high volume fly ash, Construction and Building Materials, 21:1088-1097, (2006).
Al Khalaf, M.N., et al., Effects Of Fibre Surface Composition On Mechanical Properties Of Steel Fibre Reinforced Mortars, Cem. and Conor. Res., 10(1): 71-77 (1980).

(Continued)

*Primary Examiner* — Robert D Harlan
(74) *Attorney, Agent, or Firm* — Choate, Hall & Stewart LLP; William R. Haulbrook; Ronen Adato

(57) ABSTRACT

The present invention relates to a polymer composition for forming fibers for reinforcement of cement-based composites, polymer fibers made from the composition and methods of making the polymer fibers. The polymer composition comprises an olefin polymer and a bonding agent comprising vinyl alcohol based polymer, a pozzolanic material or a combination thereof.

20 Claims, 2 Drawing Sheets

(56) References Cited

FOREIGN PATENT DOCUMENTS

| JP | S49036748 A | 4/1974 |
|----|----|----|
| JP | S60060960 A | 4/1985 |
| JP | S60081052 A | 5/1985 |
| WO | WO-2014/117257 A1 | 8/2014 |
| WO | WO-2017/201623 A1 | 11/2017 |

OTHER PUBLICATIONS

Banthia, N., A study of some factors affecting the fiber-matrix bond in steel fiber reinforced concrete, Can. J. of Civil Eng., 17(4): 610-620 (1990).

Banthia, N., and Trottier, J.F., Concrete Reinforced with Deformed Steel Fibers, Part I: Bond-Slip Mechanisms, ACI Materials J., 91(5): 435-446, (1994).

Banthia, N., and Yan, C., Bond-Slip Characteristics of Steel Fibres in High Reactivity Metakaolin (HRM) Modified Cement-Based Matrices, Cement and Concrete Research, 26(5): 657-662 (1996).

Extended European Search Report dated Mar. 11, 2020 for corresponding EP application No. 7801873.5.

International Search Report for PCT/CA2017/050630, filed May 24, 2017, 3 pages, (dated Aug. 9, 2017).

Marcincin, A. et al.,Fiber-forming blend polypropylene-polyvinyl alcohol, polymers for advanced technologies, Polym. Ady. Technol. vol. 12: 461-465, (2001).

Mayfield, B., and Zelly, B.M., Steel fibre treatment to improve bonds, Concrete, 7(3): 35-37 (1973).

Natarajan, S., and Moses, J.J., Surface modification of polyester fabric using polyvinyl alcohol in alkaline medium, Indian Journal of Fibre & Textile Research, 37: 287-291 (2012).

Szabová, R., et al., Coating of Ti02 nanoparticles on the plasma activated polypropylene fiber, Acta Chimica Slovaca, 2(1): 70-76 (2009).

Wang, J.Y. et al., Effect of shrinkage reducing admixture on flexural behaviors of fiber reinforced cementitious composites, Cement & Concrete Composites 34: 443-450 (2012).

Written Opinion for PCT/CA2017/050630, filed May 24, 2017, 5 pages, (dated Aug. 9, 2017).

Xiao, X., et al., Surface modification of polyester nonwoven fabrics by Al203 sol-gel coating, J. Coat. Technol. Res, 6(4):537-541 (2009).

\* cited by examiner

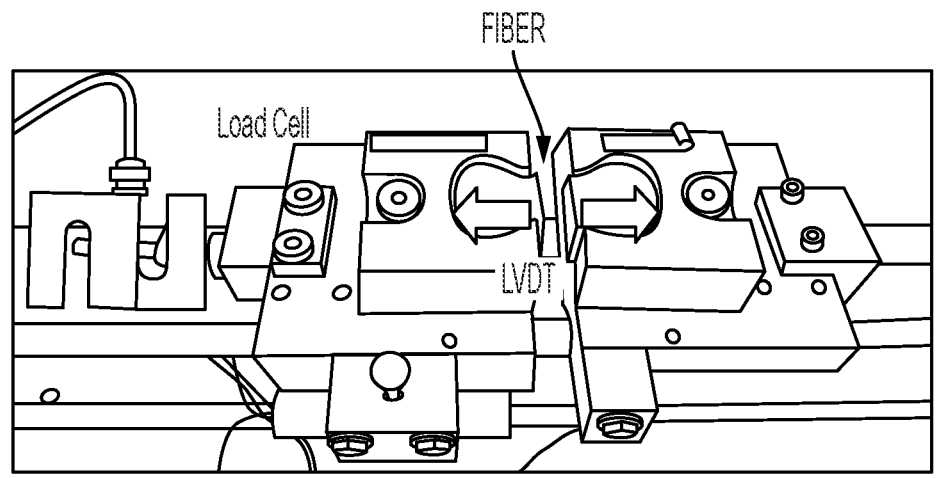
Figure 1. Pull-Out Test Configuration
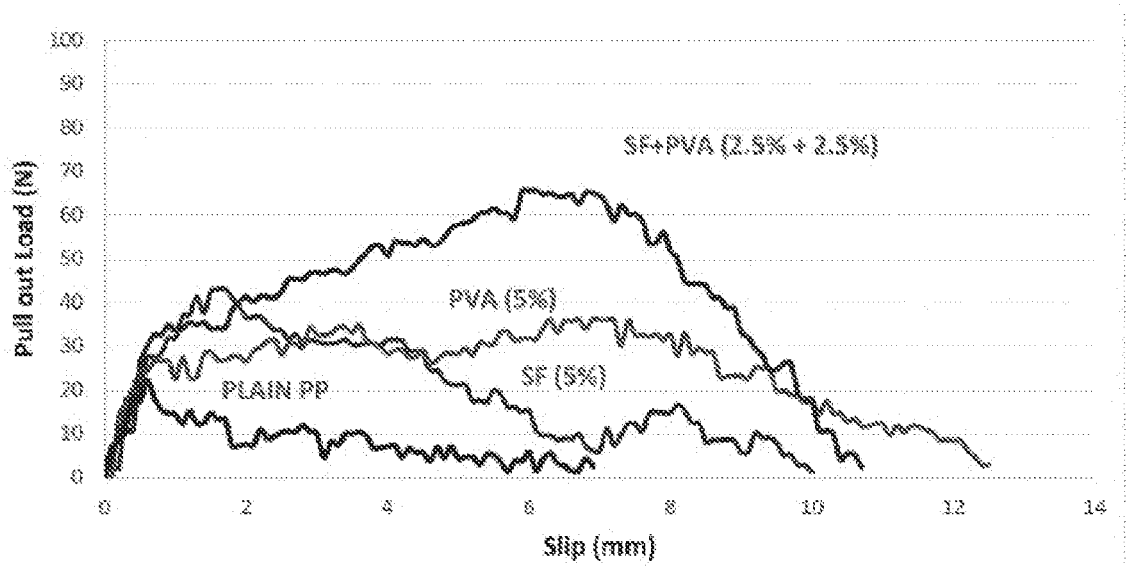
Figure 2. Pull-Out Load vs Slip Curves

POLYMER FIBERS FOR REINFORCEMENT OF CEMENT-BASED COMPOSITES

CROSS-REFERENCE TO RELATED APPLICATIONS

This application is a continuation of U.S. Application Ser. No. 16/069,879, filed Jul. 12, 2018, which is a national stage application of PCT Application No. PCT/CA2017/050630, filed May 24, 2017, and entitled "Polymer Fibers for Reinforcement of Cement-Based Comsosites," which claims priority to U.S. Provisional Application No. 62/340,671, filed May 24, 2016, and entitled "Polymer Fibers for Reinforcement of Cement-Based Composites." the contents of each of which are hereby incorporated by references in their entirety.

FIELD OF THE INVENTION

The present invention pertains to the field of polymer fibers for reinforcement of cement-based composites and in particular to the use of fibers for concrete reinforcement.

BACKGROUND

As compared to other building materials such as metals and polymers, concrete a cement based composite is significantly more brittle and exhibits a poor tensile strength. Based on fracture toughness values steel is at least 100 times more resistant to crack growth than concrete. Concrete in service thus cracks easily, and this cracking creates easy access routes for deleterious agents resulting in early saturation, freeze-thaw damage, scaling, discoloration and steel corrosion. Traditional concrete structures such as buildings, bridges and roads therefore depict less than adequate durability.

Concrete carries flaws and micro-cracks both in the material and at the interfaces even before an external load is applied. These defects and micro-cracks emanate from excess water, bleeding, plastic settlement, thermal and shrinkage strains and stress concentrations imposed by external restraints. Under an applied load, distributed microcracks propagate, coalesce and align themselves to produce macro-cracks. When loads are further increased, conditions of critical crack growth are attained at tips of the macro-cracks and unstable and catastrophic failure is precipitated.

Fiber reinforcement is a well-known method for improving the mechanical and physical properties of cement-based composites. Asbestos fiber-reinforced cements have been widely employed as building materials. The carcinogenic properties of asbestos, however, have led to governmental regulations controlling and limiting its use. Recently, natural and man-made fibers have entered the domain. These include metallic fibers such as mild steel and stainless steel, polymeric fibers such as polypropylene, nylon, polyvinyl alcohol (PVA) and polyethylene terephthalate (PET), natural fibers such as cellulose, jute, sisal, and synthetic fibers such as carbon.

Steel fibers suffer from numerous drawbacks including a high specific gravity which makes their transportation and handling difficult and expensive. Steel fibers also have the propensity to rust. Stainless steel fibers offer an increased resistance to rusting, but their use remains virtually non-existent due to their high cost and the difficulty experienced in their production and deformation. Finally, steel fibers tend to be prickly thereby having the potential to hurt the workers at jobsites. Once in place, they are also known to damage automobile and plane tires if used in roads, runways and bridge decks.

Polyolefin fibers such as polypropylene and polyester possess good inherent properties, such as high resistance to the alkaline environment found in cement-based materials, reasonably high stiffness and tensile strength, ease of production and low cost. Unfortunately, a major obstacle to the use of polyolefin fibers as reinforcement of cement-based materials is their lack of bond with the surrounding matrix. The reason for this lack of bond is the highly hydrophobic nature of polyolefins by which they repel water and resist wetting. Polyolef in fibers have been deformed to enhanced their bond with cement-based matrices (U.S. Pat. No. 5,981, 630) but such fibers consume significant energy in production and their performance continues to be low as they require large crack openings in the matrix before depicting useful crack bridging abilities.

Methods for fabricating polyolefin fibers (such as polypropylene fibers) in a way as to provide physical anchoring sites along the fibers for mechanical attachment of the cement matrix have been tried, as illustrated by U.S. Pat. Nos. 4,261,754; 4,414,030 and 4,477,522. European Patent Application No. 026 581 discloses that such fibers may be prepared by fibrillation of a polyolefin film which has been pretreated with a coupling agent such as an acid anhydride or methacryloxypropyltrimethoxy silane. Other methods involve the addition of certain thickening and clay additives to the cement slurry to hold the polypropylene reinforcing fibers in dispersion until the slurry sets, as illustrated by U.S. Pat. Nos. 4,363,666 and 4,428,775. Still another method to improve flocculation of polypropylene fibers when mixing with cement is to treat the cement-fiber mix with a water soluble or emulsifiable polymer and a polyvalent salt such as $Al_2(SO_4)_3$, as illustrated by U.S. Pat. No. 4,339,273.

Other procedures designed to render polypropylene fibers suitable as a reinforcement of cement-based materials involve physical surface modification of the fiber surface by various means. To produce cement adherent fibers U.K. Patent Application No. 2,030,891 teaches a method for embedding inorganic powders in the surface of fibrillated polypropylene. Chemical modifications of the base polyolefin from which the fibers are produced have also been suggested. U.K. Patent Application No. 2,021,552 suggests that an inorganic or organic acid group should be incorporated in the base polyolefin, either by copolymerization of acid monomers or by grafting acid groups to a prepared polyolefin, in order to improve the adherence to cement of fibers made of modified polyolefin. Polypropylene grafted with maleic anhydride is illustrated as an example of an improved material for producing cement reinforcing fibers. German Patent No. DE 3341 462, discloses treatment of the polyolefin under elevated temperature and pressure with a solution of silane or $SiCl_4$ together with silicic acid or a metal silicate and thereafter precipitates the reaction product as fibrils by lowering the temperature. The fibrils so produced are useful as asbestos fibers substitutes for reinforced cement structures.

German Patent No. DE 32 10693 discloses that the surface of polyolefin fibers can be catalytically reacted with reactive organic or inorganic Si (IV) compounds to render them adhesive to cement. U.S. Pat. No. 4,801,630 discloses a modifier composition for compounding with a polyolefin to produce a resin which is extruded into film, which in turn is oriented, fibrillated and chopped into cement adherent fibers. The modifier composition taught in this reference comprises a melt reaction product of a vinyl alcohol copolymer with 28% ethylene and a maleated polypropylene.

Polyolefin fibers have also been made compatible as reinforcement fiber for cement-based matrices only by incorporating additional compatibilizing agents into the cement-based slurry into which the fibers are admixed, by the special fabrication of the fibers to provide physical anchoring sites therein for mechanically anchoring to the cement matrix, by the chemical modification of the base polyolefin from which the fibers are then produced, or by the chemical modification of the fiber surfaces by costly and time consuming chemical reactions.

Prior art techniques described involve time and energy consuming processes and produce unsatisfactory solutions. Thus, there is still a need for polymer fibers for reinforcement of cement-based matrices that are simple to produce, depict high hydrophilicity producing a strong bond with the matrix, show good dispensability and take advantage of inherent reactions of cement hydration to produce a strong bond. Such fibers can produce cement-based composites with enhanced crack growth resistance, improved flexural toughness, flexural strength, impact strength, and fatigue endurance. Such composites when used in civil engineering structures such as bridges and roads can produce structures with improved long term durability and enhance sustainability. In particular, there is still a need for additives which when admixed with a polyolefin stock material would allow the direct production of fibers that are highly adherent to cement-based matrices and can be produced using simple, reproducible and robust processes.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

An object of the present invention is to provide a polymer composition for making reinforcing fibers. In accordance with an aspect of the present invention, there are provided polymer fibers for reinforcement of cement-based matrices comprising: a) from about 50 wt % to about 99 wt % of an olefin polymer; and b) from about 1 wt % to about 50 wt % of a bonding agent comprising vinyl alcohol based polymer, a pozzolanic material or a combination thereof.

In accordance with another aspect of the present invention, there is provided a polymer composition for forming fibers for reinforcement of cement-based composites, the composition comprises a) from about 50 wt % to about 99 wt % of an olefin polymer; and b) from about 1 wt % to about 50 wt % of a bonding agent comprising vinyl alcohol based polymer, a pozzolanic material or a combination thereof.

In accordance with another aspect of the present invention, there is provided a method of making polymer fibers for reinforcement of cement-based composites, the method comprises: a) admixing the bonding agent with the olefin polymer of the present invention and b) extruding the admixture at a temperature sufficient to melt at least the olefin polymer to produce the fiber.

In accordance with another aspect of the present invention, there are provided fibers prepared by the methods described herein.

BRIEF DESCRIPTION OF THE FIGURES

FIG. 1 illustrates pull-out test configuration for testing bonding performance of extruded fibers.

FIG. 2 illustrates average pullout load-slip curves for the fibers in accordance with one embodiment of the present invention.

DETAILED DESCRIPTION OF THE INVENTION

Definitions

Figure 3:
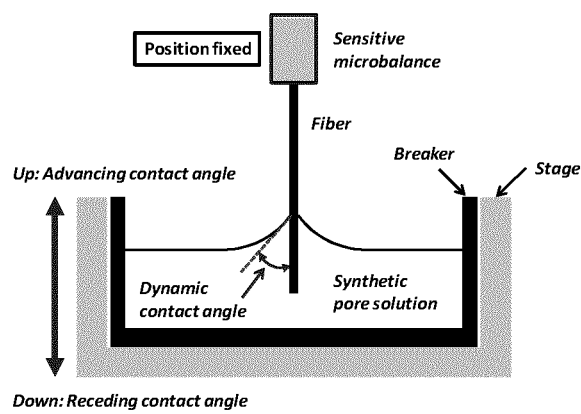
FIG. 3 is schematic diagram of a process for the treatment of hydrophiicity/wettability of extruded fibers.

The term "olefin polymer" as used herein refers to a polymer derived from an olefin monomer such as ethylene, propylene, butylene, etc. The olefin polymer can be a homo-polymer or a copolymers of these monomers.

The term "bonding agent" as used herein refers to a material which enhances bonding of polyolefin fibers with a cement-based matrix, which includes one or more vinyl alcohol polymers, and one or more pozzolanic materials.

The term "vinyl alcohol polymer" as used herein refers to a polymer derived from vinyl alcohol. This term includes homo-polymer and co-polymer of vinyl alcohol with suitable co-monomers such as ethylene, styrene and vinyl acetate.

The term "pozzolanic material" as used herein refers to siliceous or siliceous and aluminous materials which, in themselves, possess little or no cementitious value but which in finely divided form and in the presence of water, react chemically with calcium hydroxide to form compounds possessing cementitious properties.

The term "copolymer" includes block polymers and random copolymers.

The term "mono-component fiber" as used herein refers to a fiber comprising one polymeric component. For example, the polymeric composition comprising an olefin polymer along with the bonding agent as described herein.

The term "multi-component fibers" as used herein refers to fibers that combine at least two polymers having properties and/or different chemical compositions. The polymers are extruded together, and its relative position along the fiber length depends on factors like the geometry of orifice of the spinneret and the intrinsic properties of the polymer itself, including viscosity and molecular weight. For example, one polymer component comprises the polymeric composition of the present invention, and one or more polymer components comprises an olefin polymer.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this invention belongs.

The embodiments of the present invention provide polymer composition comprising a specific bonding agent which when admixed with a polyolefin stock material allows the direct production of fibers using simple, reproducible and robust processes. The fibers produced from the polymer compositions of the embodiments of the present invention exhibit high hydrophilicity, form strong bond with surrounding cement-based matrix, which can remain bonded over a longer length. The fibers of the present invention can provide an improved crack-opening resistance of a given fiber, and a better durability of the cement-based composite. The fibers of the embodiments of the present invention can produce structures with improved long term durability and enhance sustainability.

In one aspect of the present invention, there is provided a polymer composition, which comprises: from about 50 wt % to about 99 wt % of an olefin polymer; and from about 1 wt % to about 50 wt % of a bonding agent comprising a vinyl alcohol based polymer, a pozzolanic material or a combination of the vinyl alcohol based polymer and the pozzolanic material.

In some embodiments the amount of the olefin polymer is about 55%, 60%, 65%, 70%, 75%, 80%, 85%, 90%, 95% or a percentage between any two of these values.

In some embodiments the amount of the bonding agent is about 2%, 5%, 10%, 15%, 20%, 25%, 30%, 35%, 40%, and 45% or a percentage between any two of these values.

In some embodiments, the polymer composition for forming cement reinforcing fibers, comprises: from about 60 wt % to about 99 wt % of the olefin polymer; and from about 1 wt % to about 40 wt % of the bonding agent.

In some embodiments, the polymer composition for forming cement reinforcing fibers, comprises: from about 70 wt % to about 99 wt % of the olefin polymer; and from about 1 wt % to about 30 wt % of the bonding agent.

In some embodiments, the polymer composition for forming cement reinforcing fibers comprises: from about 80 wt % to about 99 wt % of an olefin polymer; and from about 1 wt % to about 20 wt % of the bonding agent.

In some embodiments, the polymer composition for forming cement reinforcing fibers comprises: from about 90 wt % to about 99 wt % of an olefin polymer; and from about 1 wt % to about 10 wt % of the bonding agent.

In some embodiments, the polymer composition for forming reinforcing fibers for cement based composites comprises: from about 92 wt % to about 98 wt % of an olefin polymer; and from about 2 wt % to about 8 wt % of the bonding agent.

In some embodiments, the olefin polymer includes homopolymers such as polyethylene, polypropylene and polybutylene. In one embodiment, the olefin polymer includes olefinic co-polymers such as ethylene-butene, propylene-ethylene, propylene-butylene copolymers, etc.

In some embodiments, the olefin polymer includes olefinic terpolymers, such as propylene-ethylene-butene terpolymers, or mixtures and blends of the above olefinic polymers.

In some embodiments, the olefin polymer is polypropylene or copolymers of propylene with minor amounts of ethylene, butylene, etc.

The vinyl alcohol based polymer includes the homopolymer of vinyl alcohol or its copolymer.

In some embodiments, the copolymer of vinyl alcohol has the following structural formula:

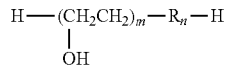

wherein:

R is any comonomer polymerizable via a free radical route which lowers the melting point of the copolymer sufficiently to allow its melt processing. Examples of such co-monomers are ethylene, styrene and vinyl acetate;

"m" and "n" refer to the numbers of each monomer unit in the chain.

In some embodiments, "m" is about 200-400 and "n" is about 100-300. Preparation of the ethylene copolymers is described in U.S. Pat. No. 3,925,336, assigned to Nippon Gohsei Co. of Japan.

In some embodiments, the vinyl alcohol based polymer is polyvinyl alcohol.

Any pozzolanic material having reactive siliceous or siliceous and aluminous materials can be used in the composition of the present invention.

Pozzolanic material can be man-made and natural. Manmade pozzolans include metakaolin, fly ash, silica fume, rice husk ash, etc. Natural pozzolans include volcanic ashes, pumices, diatomaceous earths, calcined shale, calcined clay, etc.

In one embodiment, the pozzolanic material includes one or more of fly ash, slag, silica fume, metakaolin, rice husk ash, volcanic ash, tuffs, diatomaceous earth, pumicite, calcined shale, calcined clay, and/or vitrified calcium aluminosilicate (VCAS). In one embodiment, the pozzolanic material is silica fume.

In some embodiments, the bonding agent of the composition of the present invention comprises the vinyl alcohol based polymer.

In some embodiments, the bonding agent of the composition of the present invention comprises the pozzolanic material.

In some embodiments, the composition of the present invention comprises the olefin polymer as defined above and the bonding agent comprising the vinyl alcohol based polymer.

In some embodiments, the bonding agent of the composition of the present invention comprises the vinyl alcohol based polymer and the pozzolanic material.

In accordance with the present invention the vinyl alcohol based polymer is not a reaction product of a vinyl alcohol copolymer with an acid modified polyolefin, such as described in U.S. Pat. No. 4,801,630.

In some embodiments, the polyolefin is not an acid modified polyolefin, such as maleate polypropylene.

In some embodiments, the weight ratio of said vinyl alcohol polymer and said pozzolanic material is from about 10:1 to about 1:10.

In some embodiments, the weight ratio of said vinyl alcohol polymer and said pozzolanic material is from about 5:1 to about 1:5.

In some embodiments, the weight ratio of said vinyl alcohol polymer and said pozzolanic material is from about 3:1 to about 1:3.

In some embodiments, the weight ratio of said vinyl alcohol polymer and said pozzolanic material is from about 2:1 to about 1:2.

In some embodiments, the composition of the present invention comprises about 90 to about 99 wt % of the olefin polymer and about 1% to about 10 wt % by weight of a bonding agent, wherein the bonding agent comprises the vinyl alcohol based polymer.

In some embodiments, the composition comprises about 90 to about 99 wt % of the olefin polymer and about 1 to about 10% of the bonding agent, wherein the bonding agent comprises a pozzolanic material.

In some embodiments, the composition comprises about 90 to about 99 wt % of the olefin polymer, about 0.5 to about 5 wt % of the vinyl alcohol polymer and about 0.5-5 wt % of the pozzolanic material.

In some embodiments, the composition comprises about 92 to about 98 wt % of polypropylene chips, about 2 to about 4 wt % of polyvinyl alcohol particles and about 2 to about 4 wt % of silica fume.

In some embodiments, the polymer composition further comprises one or more coupling agents. In some embodiments, the coupling agents are bi-functional coupling agents such as organosilanes In some embodiments, antioxidants, lubricants, ultraviolet absorbents, anti-static agents, inorganic fillers, organic fillers, cross linking agents, foaming agents, nucleus agents, and the like may be mixed with the polymer composition without deviating from the present invention.

In another aspect of the present invention, there is provided polymer fibers prepared from the polymer composition as defined/described above.

The polymer fibers of the present invention can be mono-component or multi-component fibers. In some embodiments the fibers are bi-component fibers. Bi-component fibers are commonly classified by their cross-sectional structure. Such structures may include, but are not limited to, side-by-side, sheath-core, eccentric sheath/core arrangement, islands-in-the-sea and/or segmented-pie cross-sectional structures. In some embodiments, the bi-component fibers have sheath and core configuration.

In some embodiments, the polymer fibers are mono-component fibers.

In some embodiments, the mono-component polymer fibers of the present invention comprise: from about 50 wt % to about 99 wt % of an olefin polymer; and from about 1 wt % to about 50 wt % of a bonding agent comprising a vinyl alcohol based polymer, a pozzolanic material or the combination of a vinyl alcohol based polymer and a pozzolanic material.

In some embodiments, the mono-component polymer fibers of the present invention comprise the olefin polymer is an amount of about 55%, 60%, 65%, 70%, 75%, 80%, 85%, 90%, 95% or a percentage between any two of these values.

In some embodiments, the mono-component polymer fibers of the present invention comprise the olefin polymer is an amount of about 2%, 5%, 10%, 15%, 20%, 25%, 30%, 35%, 40%, and 45% or a percentage between any two of these values.

In some embodiments, the mono-component polymer fibers of the present invention comprise about 60 wt % to about 99 wt % of the olefin polymer; and from about 1 wt % to about 40 wt % of the bonding agent.

In some embodiments, the mono-component polymer fibers of the present invention comprise about 70 wt % to about 99 wt % of the olefin polymer; and from about 1 wt % to about 30 wt % of the bonding agent.

In some embodiments, the mono-component polymer fibers of the present invention comprise: from about 80 wt % to about 99 wt % of an olefin polymer; and from about 1 wt % to about 20 wt % of the bonding agent.

In some embodiments, the mono-component polymer fibers of the present invention comprise about 90 wt % to about 99 wt % of the olefin polymer; and from about 1 wt % to about 10 wt % of the bonding agent.

In some embodiments, the mono-component polymer fiber of the present invention comprises about 90 to about 99 wt % of the olefin polymer and about 1% to about 10 wt % by weight of the vinyl alcohol based polymer. In one embodiment, the polymer fiber comprises about 90-99 wt % of the olefin polymer and about 1 to 10% of the pozzolanic material.

In some embodiments, the mono-component polymer fiber comprises about 90 to about 99 wt % of the olefin polymer, about 0.5 to about 5 wt % of the vinyl alcohol polymer and about 0.5 to about 5 wt % of the pozzolanic material.

In some embodiments, the mono-component polymer fiber comprises about 92 to about 98 wt % of the olefin polymer, about 2 to about 4 wt % of the vinyl alcohol polymer and about 2 to about 4 wt % of the pozzolanic material.

In some embodiments, the olefin polymer of the mon-component fiber is homo or co-polymer of ethylene, propylene, or butylene.

In some embodiments, the mono-component polymer fiber comprises about 95 wt % of polypropylene, about 2.5 wt % of polyvinyl alcohol and about 2.5 wt % of silica fume.

In some embodiments, the polymer fibers are bi-component fibers having a sheath/core arrangement, wherein the core comprises an olefin polymer as described above, and the sheath comprises the polymer composition of the present invention as described above.

In one embodiment, the olefin fiber of the core is a homo or co-polymer of ethylene, propylene, or butylene.

In some embodiments, the bi-component fiber has about 75 to about 99% core by weight of the fibber, and comprises about 1 to about 25% sheath by weight of the fiber.

In some embodiments, the bi-component fiber has about 75 to about 99% sheath by weight of the fibber, and comprises about 1 to about 25% core by weight of the fiber.

The diameter of the bi-component fiber is about 0.05 to about 2.0 mm.

The sheath of the bi-component fiber can have a thickness of at least about 0.003 mm (3 micron). In some embodiments, the sheath has a thickness of about 0.004 mm to about 0.5 mm. In some embodiments, the sheath has a thickness of about 0.005 mm to about 0.3 mm. The core can have a diameter of about 0.400 mm to about 0.500 mm.

In some embodiments, the sheath has a thickness of about 20 to 30 microns and the core as a diameter of about 400 to 490 microns.

In some embodiments, the bi-component polymer fiber of the present invention has a polypropylene, polyethylene or polybutylene core and a sheath comprised of a polymer composition comprising from about 50 wt % to about 99 wt % of an olefin polymer, and from about 1 wt % to about 50 wt % of a bonding agent comprising a vinyl alcohol based polymer, a pozzolanic material or the combination of a vinyl alcohol based polymer and a pozzolanic material.

In some embodiments, the sheath of the bi-component polymer fibers of the present invention comprise the olefin polymer is an amount of about 55%, 60%, 65%, 70%, 75%, 80%, 85%, 90%, 95% or a percentage between any two of these values.

In some embodiments, the sheath of the bi-component polymer fibers of the present invention comprise the olefin polymer is an amount of about 2%, 5%, 10%, 15%, 20%, 25%, 30%, 35%, 40%, and 45% or a percentage between any two of these values.

In some embodiments, the sheath of the bi-component polymer fibers of the present invention comprise about 60 wt % to about 99 wt % of the olefin polymer, and from about 1 wt % to about 40 wt % of the bonding agent.

In some embodiments, the sheath of the bi-component polymer fibers of the present invention comprise about 70 wt % to about 99 wt % of the olefin polymer, and from about 1 wt % to about 30 wt % of the bonding agent.

In some embodiments, the sheath of the bi-component polymer fibers of the present invention comprise: from about 80 wt % to about 99 wt % of an olefin polymer, and from about 1 wt % to about 20 wt % of the bonding agent.

In some embodiments, the sheath of the bi-component polymer fibers of the present invention comprise about 90 wt % to about 99 wt % of the olefin polymer, and from about 1 wt % to about 10 wt % of the bonding agent.

In some embodiments, the sheath of the bi-component polymer fiber of the present invention comprises about 90 to about 99 wt % of the olefin polymer and about 1% to about 10 wt % by weight of the vinyl alcohol based polymer. In one embodiment, the sheath comprises about 90-99 wt % of the olefin polymer and about 1 to 10% of the pozzolanic material.

In some embodiments, the sheath of the bi-component polymer fiber comprises about 90 to about 99 wt % of the olefin polymer, about 0.5 to about 5 wt % of the vinyl alcohol polymer and about 0.5 to about 5 wt % of the pozzolanic material.

In some embodiments, the sheath of the bi-component polymer fiber comprises about 92 to about 98 wt % of the olefin polymer, about 2 to about 4 wt % of the vinyl alcohol polymer and about 2 to about 4 wt % of the pozzolanic material.

In some embodiments, the bi-component polymer fiber of the present invention has a polypropylene core and a sheath comprised of a polymer composition comprising about 92 to about 98 wt % of polypropylene, about 2 to about 4 wt % of polyvinyl alcohol and about 2 to about 4 wt % of silica fume.

In some embodiments, the bi-component polymer fiber of the present invention has a polypropylene core and a sheath comprised of a polymer composition comprising about 95 wt % of polypropylene, about 2.5 wt % of polyvinyl alcohol and about 2.5 wt % of silica fume.

In some embodiments, the polymer fibers of the present invention are used for reinforcement of cement based composites.

The mono-component polymer fibers of the present invention can be prepared by mixing or blending the olefin polymer with the bonding agent as described above and extruding the mixture/blend at a temperature sufficient to melt at least the olefin polymer.

The olefin polymer can be in powder or chip form, and vinyl alcohol polymer can be in powder or particle form. In one embodiment, the polypropylene chips are combined with the polyvinyl alcohol particles.

In some embodiments, the extrusion step is carried out at a temperature sufficient to melt the olefin polymer only.

In some embodiments, the extrusion step is carried out at a temperature sufficient to melt the olefin polymer and the vinyl alcohol polymer.

In some embodiments, the polymer fiber of the present invention is formed using a two-stage process, wherein the first stage involves producing the fiber in an amorphous state using an extruder device, wherein at least the olefin polymer is heated to a homogenous melt and pumped through the die at a constant rate. The second stage involves drawing of the fiber obtained from the extruder to obtain the fiber of a desired property.

In some embodiments, the fiber obtained from the first stage is an amorphous fiber, which is drawn in the second stage through a heating system to produce a crystalline fiber. This stage involves the use of a set of drawing units preferably capable of running at different speeds. The process stretches the fiber while it is still soft and at a high temperature. At the other end, a high strength fiber is obtained.

In some embodiments, the mixture/blend is extruded at a temperature from about 120° C. to about 250° C.

In some embodiments, the amorphous fibers are drawn at a temperature of from about 150° C. to about 200° C. to form a crystalline fiber.

The bi-component fibers of the present invention can be prepared by co-extrusion processes known in the art. In some embodiments, the bi-component fibers are prepared by mixing or blending the olefin polymer with the bonding agent to prepare the polymer composition, and co-extruding the polymer composition with an olefin polymer (which can be different or same as the olefin polymer of the polymer composition) at a temperature sufficient to melt at least the olefin polymers of core and sheath. In some embodiments, the co-extrusion step is carried out at a temperature sufficient to melt the olefin polymer of core and the olefin polymer of the sheath only.

The polymer fibers (mono, bi and multi component fibers) prepared by the method described above, can have a diameter of about 0.05 mm to about 2.0 mm.

Polymer fibers prepared in accordance with the present invention are suitable for reinforcement of common cement-based materials with binders such as various ASTM types of Portland cements covered by ASTM C150 (Type I, Type IA, Type II Type IIA, Type II(MH), Type II(MH)A, Type III, Type IIIA, Type IV, Type V), ASTM C595 (Type IS, Type IP, Type IL and Type IT) and ASTM C11574 (Type GU, Type HE, Type MS, Type HS Type MH and Type LH). marble cements, trass cement, gypsum cements, lime-based cements, phosphates and others. In addition to the polymer fibers of the present invention, the cement composition may contain further additives and fillers such as fly ash, limestone, quartz, pearlite, rock wool, cellulose, diatomaceous earth, flue dust, pozzolana or combinations thereof.

In some embodiments, the fibers obtained from the polymer composition of the present invention can be further subjected to surface modification treatment. The surface modification treatment can include one or more of roughening of the surface using grit or powder blasting, etc.; placing deformation such as crimps, hooks, enlarged ends, pinches, etc.; plasma treatment, ozone treatment, acid etching, and coating of fiber surface with one or more coupling agents. In some embodiments, the coupling agents can be bi-functional coupling agents such as organosilanes.

In some embodiments, the surface modification can include chemical modifications. In some embodiments, the chemical modification is not oxidation and/or fluorination.

In another aspect of the present invention, there is provided a fiber reinforced cement based composite, comprising the polymer fibers of the present invention.

In some embodiments, the cement composites are prepared by mixing polymer reinforcing fibers of the present invention with the cement slurry in a predetermined amount. In one embodiment, the cement based composite comprises about 0.5% to about 20% by volume (dry basis) of the polymer fibers of the present invention. In one embodiment, the cement based composite comprises from about 1% to about 10% by volume of the polymer fibers. In one embodiment, the cement based composite comprises from about 2% to about 8% by volume of the polymer fibers.

In order to obtain more uniform dispersion of the reinforcing fibers in the cement composite, one can employ known inert, dense fillers such as methyl cellulose, silica fume, $CaCO_3$, talc and the like.

In some embodiments, the cement compositions further comprise fine aggregates and/or coarse aggregates.

The invention will now be described with reference to specific examples. It will be understood that the following examples are intended to describe embodiments of the invention and are not intended to limit the invention in any way.

EXAMPLES

Example 1: Preparation of Polymer Compositions

The following exemplary compositions were prepared by admixing polypropylene (PP) chips with the bonding agent comprising polyvinyl alcohol (PVA) powder and/or Silica Fume (SF).
Composition 1: about 95% by weight PP and about 5% by weight SF.
Composition 2: about 95% by weight PP and about 5% by weight PVA.
Composition 3: about 95% by weight PP, about 2.5% by weight SF and about 2.5% by weight PVA.

Example 2: Preparation of Mono-Component Polymer Fibers

The three polymer compositions of Example 1 were then each extruded (separately) using Dynisco Polymer Test LME model LME-120 (FIG. 1), which has two temperature controllers, one each for the rotor and the header and also contains a speed control for adjusting the rotor speed. The other component was a dial gauge which indicates the clearance between the rotor's surface and the header inner side. The extruder also has a cooling system connecting the hopper to water supply and drain. This arrangement helps to prevent the polymer chips from melting inside the hopper.

The polymer composition was placed in a cooled hopper where it fell onto the hot surface of a cylindrical rotor. As the rotor turned, the polymer composition dragged against the inclined surface of the stationary scroll and moved toward the outlet die. As the specimen collected in the radial gap, it was compressed by the converging space between the scroll surface and the end of the header case. Polypropylene was melted through heat conduction created by the mechanical work of the turning rotor. When sufficiently melted, the specimen moved to the axial gap where it was rotationally sheared between the end of the rotor and the inside case. This motion caused a centripetal pumping effect, enabling the polymer composition to flow to the outlet die and exit though the nozzle.

In order to obtain the desired final product, the fiber was further drawn to obtain the crystalline fiber with the final size of 0.5 mm diameter. A pair of Randcastle drawing stand model No. RCP-MSS Godet were used. The incorporated oven with precision temperature controller for accurate drawing was set between the drawers. The draw stands consist of low (10.2 Feet Per Minute, FPM) and high (42 Feet Per Minute, FPM) speed design. Each godet has a 5.5 inch diameter, ambient, friction roll 3.055 inches wide, and is chrome plated. The oven consists of 12 inches long heat chamber, insulated access door, mounting plate with leveling pads, and a single zone digital temperature controller with thermocouple.

During the extrusion process both rotor and header temperatures were set at the upper range of polypropylene melting point (about 175° C.). The temperature fluctuated within the range of ±3° C. in the rotor and ±10° C. in the header during production. The initial setting of the motor speed was 30 RPM and the nozzle has 2.0 mm diameter orifice. These settings were able to produce the fiber at a constant speed.

In order to match the speed of the flowing polymer out of the extruder nozzle, the speed of the godet roll at the lower speed drawer was set to 5.6 FPM (Feet per Minute) or 2.84 cm/sec. This extrusion process produce an amorphous material which was pulled to the godet roll and hot drawn to a size of 1.4±0.2 mm diameter.

The amorphous fiber was further drawn and collected at the high speed godet roll through the oven to produce semi crystalline fiber with a final size of 0.5±0.2 mm diameter. The speed of the godet roll of the higher speed drawer was set to 15.0 FPM or 7.62 cm/sec. The temperature of the oven was set at 175±20° C.

Table 1 shows the properties of the PP chips and Table 2 shows the detail of the extrusion equipment settings.

TABLE 1

Material characteristics of polypropylene chips

| Properties | Value |
| --- | --- |
| Melt flow rate | 16 g/10 min |
| Tensile strength at yield | 37 MPa |
| Elongation at yield | 11% |
| Flexural Modulus | 1500 MPa |
| Notched Izod Impact Strength | 25 J/m |
| Heat Deflection Temperature | 105° C. |

TABLE 2

Extrusion Settings

| | | |
| --- | --- | --- |
| Rotor temperature | 175 ± 3° C. | |
| Header temperature | 175 ± 10° C. | |
| Motor speed | 30 RPM | |
| Nozzle hole size | 2.0 min | |
| Oven temperature | 175 ± 20° C. | |
| Low speed drawer | Setting: 5.6 FPM (2.84 cm/sec) | Output: 1.4 ± 0.2 mm diameter Amorphous PP fiber |
| High speed drawer | Setting: 15.0 FPM (7.62 cm/sec) | Output: 0.5 ± 0.2 mm diameter Crystalline/Semi crystalline PP fiber |
| Drawing ratio | 2.6-2.8 | |

Example 3: Bonding Performance of Extruded Fibers

Single fiber pull out tests were conducted on produced fibers to evaluate their bond performance with the cement-based matrix. Testing procedure as described in Banthia, N., A Study of Some Factors Affecting the Fiber-Matrix Bond in Steel Fiber Reinforced Concrete, *Can. J. of Civil Eng.*, 17(4), 1990, pp. 610-620 was adopted. FIG. 1 shows the test configuration.

In a test, dogbone-shaped specimens measuring 25.4×78 mm with contour at both ends were used. The specimens were prepared by positioning each 50 mm fiber in dogbone-shaped mold, 25 mm embedded length on either side of the plastic separator placed in the middle and represented a crack. The fiber was placed fully aligned with the loading direction. Extreme care was taken to place the fiber exactly at the center of the specimen with respect to specimen depth and aligned at an angle of 0° with respect to the longitudinal axis of the specimen.

A mortar mixture with proportions of water:cement:sand=0.5:1:1.9 was poured in the mould and lightly vibrated for about 30 s. For each test 10 specimens were cast. After casting the specimens were covered with plastic sheets and then stored under ambient condition comprising a temperature of 20±3° C. and a humidity of 70±10%. They were demolded 24 h after casting and then stored in the in a curing tank full of lime-saturated water and cured for another 13 days until tested.

The dogbone-shaped grips carried a load cell on one side and a motor on the other. The motor applied the displacement, thus separating the two halves of the specimen and the load cell measured the load. An LVDT monitored the exact displacement during the test which was reported as fiber slip. The speed of the electric motor was controlled. In a test, the applied load vs. fiber end-slip were monitored and continuously acquired using a computer-based data acquisition system at a frequency of 5 Hz.

The Test results are illustrated in FIG. 2, where Pull-Out Load and Slip response of the various fibers is plotted. FIG. 2 illustrates the effort required to pull a bonded fiber from a cement-based matrix. Greater the Pull-out Load required, greater is the strength of the bond between the fiber and the surrounding cement-based matrix. Also, a larger ultimate Slip implies that the fiber remains bonded over a longer length. Collectively, therefore, the area under the curves in FIG. 2 signifies the energy consumed in the process of pull-out and is a measure of the crack opening resistance of the fiber being tested. A greater area under the curve would mean an enhanced bond and an improved crack-opening resistance of a given fiber. A greater area under the curve would also imply a better durability of the cement-based composite in real life.

Test results in FIG. 2 show that the co-extrusion of PP with SF or PVA or PVA and SF enhances the bond performance of the fiber. Energy values in Table 3 indicate that energy absorption is also significantly enhanced as a result of co-extrusion and the synergy described above is maintained.

TABLE 3

| | Energy Values (N-mm) | | | |
|---|---|---|---|---|
| | Plain | SF 5% | PVA 5% | SF2.5% + PVA2.5% |
| Energy Total | 56.20 | 204.76 | 310.20 | 460.11 |
| Enemy (5 mm slip) | 49.76 | 151.47 | 138.83 | 208.81 |

Example 4: Measurement of Hydrophilicity/Wettability of Extruded

Fibers Contact angle, θ, is a quantitative measure of the wettability of a solid by a liquid and is defined geometrically as the angle formed by a liquid at the three-phase boundary where a liquid, gas and solid intersect. A K14 Krüss tensiometer was used for measuring the dynamic contact angle between fiber and water using the Micro-Wilhelmy technique. A schematic diagram of this method is given in FIG. 3. A constant advancing speed of 5 mm/min was used. Since the advancing contact angle is more stable and with a smaller standard deviation, it was chosen to describe the wettability of the fiber as opposed to the receding angle. The following results were obtained indicating that the fiber obtained from the polymer composition of the present invention via the extrusion process described above demonstrated increased wettability.

| Fiber | Percent Reduction in the Advancing Contact Angle, θ, over Plain PP |
|---|---|
| Plain PP Fiber | — |
| Plain PP + 5% Poly Vinyl Alcohol (PVA) | 18% |
| Plain PP + 5% Silica Fume (SF) | 4% |
| Plain PP + 2.5% Poly Vinyl Alcohol (PVA) + 2.5% Silica Fume (SF) | 11% |

The above data is very helpful in understanding the mechanisms of bond enhancement in the fiber with the additives. There are two underlying mechanisms: hydrophilicity and pozzolanic reaction. PVA improved hydrophilicity (wettability)—and thereby reducing the contact angle—and Silica Fume provides the pozzolanic reaction, as it does not substantially reduce the contact angle). In agreement with this hypothesis, data in the Table above indicate that at about 5% PVA, there is a significant drop in the contact angle (18%), and when 5% Silica Fume is added, the contact angle reduction is insignificant (only 4%). When about 2.5% PVA+about 2.5% Silica Fume are added to the fiber, there was no compromise in the hydrophilicity imparting effect of PVA by pozzolanic reaction contribution from silica fume or vice versa. In fact both components retained their respective contribution, as the effectiveness of PVA is visible in proportion to its amount and the SF appears to provide a mild contribution in contact angle reduction. While not to be bound by any theory, it is believed that the bond enhancement in the pull-out resistance of the fiber with about 2.5% PVA+about 2.5% SF is therefore a combination of wettability (enhancement in the hydrophilic nature) due to PVA and the pozzolanic character of SF.

It also believed that in order to achieve that the bond enhancement PVA and SF do not have to be in 1:1 ratio, however a desired level of hydrophilicity and bond enhancement can be achieved by varying the relative amounts of PVA and SF.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

I claim:

1. Fibers for reinforcement of cement-based composites, comprising a polymer composition, the polymer composition comprising:
    a) from about 50% to about 99% of an olefin polymer by weight of the composition; and
    b) from about 1% to about 50% of a bonding agent comprising vinyl alcohol based polymer and a pozzolanic material, by weight of the composition.

2. The fibers of claim 1, wherein said fibers have a diameter of about 0.05 to about 2.0 mm.

3. The fibers of claim 1, wherein said fibers are monocomponent fibers.

4. The fibers of claim 1, wherein said fibers are bi-component fibers.

5. A fiber reinforced cement based composite, comprising:
    about 0.1 to about 10%, by volume of the composite, polymer fibers comprising a polymer composition, the polymer composition comprising:

a) from about 50% to about 99% of an olefin polymer by weight of the composition; and
b) from about 1% to about 50% of a bonding agent comprising vinyl alcohol based polymer and a pozzolanic material, by weight of the composition.

6. The cement based composite of claim 5, wherein said fibers have a diameter of about 0.05 to about 2.0 mm.

7. The cement based composite of claim 5, further comprising fine aggregates and/or coarse aggregates.

8. The fibers of claim 1, wherein the olefin polymer is from about 60 wt % to about 99 wt %, and said bonding agent is from about 1 wt % to about 40 wt %, by weight of the polymer composition.

9. The fibers of claim 1, wherein the olefin polymer is a member selected from the group consisting of polyethylene, polybutylene, and polypropylene.

10. The fibers of claim 1, wherein the olefin polymer is polypropylene or a copolymer of propylene with ethylene and/or butylene.

11. The fibers of claim 1, wherein a weight ratio of the vinyl alcohol polymer and the pozzolanic material is from about 10:1 to about 1:10.

12. The fibers of claim 1, wherein the vinyl alcohol based polymer comprises polyvinyl alcohol.

13. The fibers of claim 1, wherein the vinyl alcohol based polymer is a copolymer of polyvinyl alcohol with a monomer selected from the group consisting of ethylene, propylene, styrene and vinyl acetate.

14. The fibers of claim 1, wherein the pozzolanic material comprises one or more members selected from the group consisting of fly ash, silica fume, metakaolin, rice husk ash, volcanic ash, pumicite, calcined shale, calcined clay, and vitrified calcium alumino-silicate (VCAS).

15. The fibers of claim 1, wherein the pozzolanic material comprises silica fume.

16. The cement based composite of claim 5, wherein the olefin polymer is from about 60 wt % to about 99 wt %, and said bonding agent is from about 1 wt % to about 40 wt %, by weight of the polymer composition.

17. The cement based composite of claim 5, wherein the olefin polymer is a member selected from the group consisting of polyethylene, polybutylene, and polypropylene.

18. The cement based composite of claim 5, wherein a weight ratio of the vinyl alcohol polymer and the pozzolanic material is from about 10:1 to about 1:10.

19. The cement based composite of claim 5, wherein the vinyl alcohol based polymer comprises polyvinyl alcohol.

20. The cement based composite of claim 5, wherein the pozzolanic material comprises one or more members selected from the group consisting of fly ash, silica fume, metakaolin, rice husk ash, volcanic ash, pumicite, calcined shale, calcined clay, and vitrified calcium alumino-silicate (VCAS).

* * * * *